United States Patent [19]

Duvdevani

[11] 4,407,998
[45] Oct. 4, 1983

[54] HIGH IMPACT POLYPROPYLENE RESIN

[75] Inventor: Ilan Duvdevani, Leonia, N.J.

[73] Assignee: Exxon Research and Engineering Co., Florham Park, N.J.

[21] Appl. No.: 292,298

[22] Filed: Aug. 12, 1981

Related U.S. Application Data

[63] Continuation of Ser. No. 222,371, Jan. 5, 1981, abandoned.

[51] Int. Cl.³ .................. C08G 23/12; C08K 5/09; C08K 5/20
[52] U.S. Cl. ..................... 524/229; 524/322; 524/211; 524/394; 524/400; 525/232
[58] Field of Search ............... 525/240, 232; 524/210, 524/211, 229, 300, 322, 394, 400

[56] References Cited

U.S. PATENT DOCUMENTS

| | | | |
|---|---|---|---|
| 3,642,728 | 2/1972 | Canter | 525/344 |
| 3,974,240 | 8/1976 | Bock | 260/23.5 A |
| 3,974,241 | 8/1976 | Lundberg | 260/23.5 A |
| 4,151,137 | 4/1979 | Duvdevani | 260/23.5 A |
| 4,153,588 | 5/1979 | Makowski | 260/23.5 A |
| 4,160,751 | 7/1979 | Bock | 260/23.5 A |
| 4,164,512 | 8/1979 | Brenner | 521/93 |

Primary Examiner—C. A. Henderson
Attorney, Agent, or Firm—Richard E. Nanfeldt

[57] ABSTRACT

An injection molding or extrusion polypropylene composition having improved impact strength and improved weld line properties, wherein the polypropylene composition comprises a blend composition of an isotactic polypropylene homopolymer having a number average molecular weight as measured by GPC of at least 15,000, about 5 to about 15 parts by weight of a zinc neutralized sulfonated EPDM terpolymer per 100 parts by weight of the isotactic polypropylene homopolymer, and about 5 to about 15 parts by weight of a high molecular weight polypropylene.

8 Claims, No Drawings

HIGH IMPACT POLYPROPYLENE RESIN

This application is a continuation application of Ser. No. 222,371 filed Jan. 5, 1981, now abandoned.

FIELD OF THE INVENTION

An injection molding or extrusion polypropylene composition having improved impact strength and improved weld line properties, wherein the polypropylene composition comprises a blend composition of an isotactic polypropylene homopolymer having a number average molecular weight as measured by GPC of at least 15,000, and about 5 to about 15 parts by weight of a zinc neutralized sulfonated EPDM terpolymer per 100 parts by weight of the isotactic polypropylene homopolymer.

A major problem in injection molding or extrusion of a polypropylene resin is the achievement of a suitable article exhibiting both good impact strength and weld line elongation while maintaining a relatively high stiffness of the product. Weld line elongation is a measure of impact strength at regions including polypropylene homopolymer can be achieved by addition of elastomers such as ethylene-propylene copolymers or terpolymers. However, this type of modification leads to weakening of fabricated articles in product regions that include weld lines resulting from the joining of polymer melt streams progressing from different directions during the fabrication process. The compositions of this invention provide good impact as well as good weld line elongation.

BACKGROUND OF THE INVENTION

A diversity of means have been employed for attempting to improve the impact strength and weld line elongation of polypropylene resins. The use of sulfonated EPDM terpolymers to accomplish these objectives is not mentioned in the literature; however, sulfonated EPDM terpolymers have been blended with polyolefinic resins in an attempt to improve the rheological properties of the sulfonated EPDM terpolymers.

U.S. Pat. No. 3,642,728, herein incorporated by reference, generally refers to the concept of blending a sulfonated elastomeric polymer. However, this patent fails to recognize that improved impact and weld line elongation of polypropylene can be achieved by the use of a critical concentration (5 to 15 parts by weight) of a neutralized sulfonated EPDM terpolymer, wherein the elastomeric polymer must be an EPDM terpolymer and the sulfonate groups must be neutralized with a zinc counterion. For example, the use of a magnesium or barium counterion as well as an organic amine as a counterion will not provide a desirable level of improved impact and weld line elongation. High concentrations of rubber may provide good impact, but stiffness is then too low and the polypropylene is inferior to high density polyethylene.

U.S. Pat. No. 3,974,240 teaches blend compositions of a $C_2$ to $C_4$ polyolefinic polymer and a sulfonated elastomeric polymer, wherein the concentration of the polyolefinic thermoplastic is 10 to 90 parts by weight per 100 parts of sulfonated elastomeric and more preferably 20 to 90 and most preferably 30 to 70, wherein the experimental data shows blends of 35 parts by weight of sulfonated elastomer.

U.S. Pat. No. 3,974,241 again teaches blend compositions of a $C_2$ to $C_4$ polyolefinic polymer and a sulfonated elastomeric polymer wherein the concentration of the sulfonated elastomer is already greater than the concentration of the polyolefinic thermoplastic.

Both U.S. Pat. No. 3,974,240 and U.S. Pat. No. 3,974,241 fail to teach the critical concentration range of the instant invention of 5 to 15 parts by weight of a sulfonated EPDM terpolymer per 100 parts by weight of the polypropylene resin. Additionally, both of these patents fail to teach the critical selection of an isotactic polypropylene homopolymer having an Mn as measured by GPC of at least 15,000, furthermore, these two patents fail to appreciate the criticality of using only a sulfonated EPDM terpolymer, wherein the sulfonate groups must be neutralized with a zinc counterion and not a magnesium, barium or amine counterion as in U.S. Pat. Nos. 3,974,240 and 3,974,241.

U.S. Pat. Nos. 3,974,240; 3,974,241; and 3,642,728 are all directed to elastomeric systems wherein a polyolefin plastic is added to the thermoplastic in minor proportions in order to modify the rheological properties of the elastomer. The compositions of the instant invention are directed to thermoplastic systems, wherein a sulfonated elastomer is added in minor proportions to the thermoplastic.

SUMMARY OF THE INVENTION

An injection molding or extrusion polypropylene composition having improved impact strength wherein the polypropylene composition comprises a blend composition of an isotactic polypropylene homopolymer having a number average molecular weight as measured by GPC of at least 15,000, and about 5 to about 15 parts by weight of a zinc neutralized sulfonated EPDM terpolymer per 100 parts by weight of the isotactic polypropylene homopolymer. The further addition of about 5 to about 15 parts by weight of a high molecular weight polypropylene or high density polyethylene, preferably polypropylene, per 100 parts of the isotactic polypropylene homopolymer improves weld line elongation.

GENERAL DESCRIPTION

This present invention relates to unique and novel modified injection moldable or extrudable polypropylene resins that exhibit improved impact strengths as well as improved weld line elongation. These injection moldable or extrudable polypropylene resins generally comprise a blend composition of an isotactic polypropylene homopolymer and about 5 to about 15 parts of a zinc neutralized sulfonated EPDM terpolymer, and more preferably about 8 to 13 parts and most preferably about 11 parts. The polypropylene resins comprising the blend of isotactic polypropylene homopolymer and zinc neutralized EPDM terpolymer having an Izod impact strength unnotched at $-30°$ C. of at least 8 ft.-lb/in., and more preferably at least 9 ft.-lb/in. Improvement in weld line elongation is achieved by the addition of about 5 to about 15 parts of a high molecular weight polypropylene or high density polyethylene, more preferably high molecular weight polypropylene, per 100 parts by weight of the isotactic polypropylene homopolymer. The high molecular weight polypropylene, for example, Exxon E-612, has a melt flow rate of less than about 1 and an $\overline{Mn}$ of about 80,000.

A typical isotactic polypropylene homopolymer which is readily used in the instant blend composition is E-117 (Exxon Chemical Co.) which has an $\overline{Mn}$ as measured by GPC of about 42,000, a density of about 0.90 grams/cc., a heptane insoluble fraction in excess of 90%, an Izod impact unnotched at −30° C. of less than 5 ft.-lb/in.

The zinc neutralized sulfonated EPDM terpolymers of the instant invention are derived from EPDM terpolymers which are low unsaturated polymers having about 1 to about 10.0 wt.% olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt.% ethylene and about 1 to about 10 wt.% of a diene monomer, the balance of the polymer being propylene. Preferably, the polymer contains about 45 to about 75 wt.% ethylene, e.g. 50 wt.% and about 2.5 to about 8.0 wt.% diene monomer, e.g. 5.0 wt.%. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 50 and having an ethylene content of about 50 wt.% and 5-ethylidene-2-norbornene content of about 5.0 wt.%. The $\overline{Mn}$ as measured by GPC of Vistalon 2504 is about 47,000, the $\overline{Mv}$ as measured by GPC is about 145,000 and the $\overline{Mw}$ as measured by GPC is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The Mn as measured by GPC of Vistalon 2504-20 is about 26,000, the $\overline{Mv}$ as measured by GPC is about 90,000 and the $\overline{Mw}$ as measured by GPC is about 125,000.

Nordel 1320 (DuPont) is another terpolymer having a Mooney viscosity at 212° F. of about 25 and having about 53 wt.% of ethylene, about 3.5 wt.% of 1,4-hexadiene, and about 43.5 wt.% of propylene.

The EPDM terpolymers of this invention have a number average molecular weight ($\overline{Mn}$) as measured by GPC of about 10,000 to about 200,000; more preferably of about 15,000 to about 100,000; most preferably of about 20,000 to about 60,000. The Mooney viscosity (ML, 1+8, 212° F.) of the EPDM terpolymer is about 5 to about 50, more preferably about 10 to about 50, and most preferably about 15 to about 40. The $\overline{Mv}$ as measured by GPC of the EPDM terpolymer is preferably below about 350,000 and more preferably below about 300,000. The $\overline{Mw}$ as measured by GPC of the EPDM terpolymer is preferably below about 500,000 and more preferably below about 350,000.

The EPDM terpolymer is sulfonated by dissolving the EPDM terpolymer in a non-reactive solvent such as a chlorinated aliphatic hydrocarbon, chlorinated aromatic hydrocarbon, an aromatic hydrocarbon or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and nonreactive solvent at a temperature of about −100° C. to about 100° C. for a period of time of about 1 to about 50 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophenol, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cyclo aliphatic alcohol such as a cyclohexanol or with water. The sulfonated EPDM terpolymer has about 5 to about 40 meq. sulfonate groups per 100 grams of sulfonated polymer, more preferably about 10 to about 35; and most preferably about 15 to about 30. The meq. of sulfonate groups/100 grams of polymer is determined by both titration of the polymeric sulfonic acid and Dietert Sulfur analysis. In the titration of the sulfonated polymer, the polymer is dissolved in a solvent consisting of 95 parts of toluene and 5 parts of methanol at a concentration level of 50 grams per liter of solvent. The sulfonated polymer is titrated with ethanolic sodium hydroxide to an Alizarin-Thymolphthalein endpoint.

Neutralization of the sulfonated elatomeric polymer is done, for example, by the addition of a solution of neutralizing agent such as a zinc acetate to the sulfonated elastomeric polymer dissolved in the mixture of the aliphatic alcohol and non-reactive solvent. The zinc acetate is dissolved in a binary solvent system consisting of water and/or aliphatic alcohol.

Sufficient neutralizing agent is added to the solution of the sulfonated elastomeric polymer to effect neutralization of the sulfonate groups. It is preferable to neutralize at least 95% of the sulfonate groups, more preferably about 98%, most preferably 100% ZnO and $Mg(OH)_2$ can also be employed to effect the neutralization of the sulfonate groups.

TP320 is derived from an EPDM terpolymer (Royalene 521-Uniroyal) which has 50% ethylene and a Mooney viscosity of 40 at 100° C., wherein the result sulfonated polymer has about 25 meq. of zinc sulfonate groups.

The use of other metal ions such as barium or magnesium as well as organic amines does not produce neutralized sulfonated EPDM terpolymers which are capable of improving the impact strength along with the weld line elongation of an isotactic polypropylene homopolymer. Additionally, if an elastomeric polymer other than an EPDM terpolymer is used such as a Butyl rubber achievement of improved impact strength along with improved weld line elongation is not realized.

To the blend of isotactic polypropylene and sulfonated EPDM terpolymer can be added a preferential plasticizer which is used to improve the dispersability of the sulfonated EPDM terpolymer in the polypropylene matrix. The preferential plasticizer of the instant invention is selected from the group consisting of carboxylic acids having about 12 to about 30 carbon atoms; metallic salts of carboxylic acid, wherein the metallic ion of said salts is selected from the group consisting of antimony, lead, aluminum, iron and Groups IA, IIA, IB and IIB of the Periodic Table of Elements; amides, and thioureas. The preferential plasticizer is incorporated into the blend composition at about 1 to 30 parts by weight of preferential plasticizer per 100 parts by weight of the neutralized sulfonated EPDM terpolymer, more preferably about 3 to about 25, and most preferably 4 to 20.

DETAILED DESCRIPTION

The advantages of the physical properties of the modified polypropylene resins of the present invention can be more readily appreciated by reference to the following examples and tables.

DESCRIPTION OF THE PREFERRED EMBODIMENTS

Example 1

A sulfonated EPDM terpolymer (TP-320) is prepared by sulfonating a 40 Mooney viscosity at 100° C. EPDM terpolymer (Royalene 521-Uniroyal) which has about 50 wt.% ethylene, about 5 wt.% ENB, with acetyl sulfate and neutralizing with $Zn(Ac)_2$ according to the procedure of U.S. Pat. No. 3,836,511, herein incorporated by reference thereby producing 25 meq. of zinc sulfonate groups per 100 grams of the EPDM polymer. TP-342 is prepared by the same sulfonation procedure of Royalene 521 except that 20 meq. of sulfonate groups are introduced which are then neutralized by $Ba(OH)_2$.

Example 2

A general purpose injection molding grade of isotactic polypropylene resin (E-117, Exxon) is blended with the sulfonated EPDM terpolymer (TP-320) or with EP/EPDM rubbers and a third ingredient which is a high density polyethylene (Paxon AB-50-003) or a low melt flow rate polypropylene (Exxon, E-612) in the following manner. A master batch of the rubber and the third ingredient at a weight ratio of 1:1 was blended in a laboratory Banbury intensive batch mixer. For sulfonated EPDM a preferred ionic plasticizer, zinc stearate, was added at a level of 4 phr. The master batch was mixed for 4-10 minutes starting with a high mixer speed which was then reduced to maintain a mix temperature of about 400° F.

The above master batch was granulated after cooling and mixed with the E-117 polypropylene in the laboratory Banbury mixer at a concentration level of about 20 wt.% master batch, yielding a product with 10 wt.% rubber. This second mix (or let-down) is done at a high speed of mixing for 4-10 minutes and dumped out of the mixer at a temperature of about 350° F.

The modified PP material was then injection molded for testing. A laboratory screw injection molding machine was used with a flat temperature profile of 220° C. ASTM Izod bars and type 4 dumbbells with and without weld lines were molded. To obtain a weld line in the dumbbell, the mold was made with two injection ports, each into opposite sides of the dumbbell. For Gardner impact test discs of 2 inch diameter and 0.10 inch thickness were injection molded.

TABLE 1

IMPACT IMPROVEMENT OF EXXON POLYPROPYLENE E-117 WITH THE ADDITION OF RUBBERS AT A 10 WT % LEVEL

| | −30° C. Impact | | 23° C. Flex | 23° C. Tensile | |
| --- | --- | --- | --- | --- | --- |
| Rubber | Izod ft-lb/in | Gardner in-lb/0.125 in | Modulus k psi | Yield psi | Weld Line Elongation, % |
| None | 3.5 | <8 | 182 | 4020 | 430 |
| Vistalon 404[1] (EP) | 11.4 | 72–185 | 129 | 3120 | 2 |
| Vistalon 404[2] (EP) | 6.1 | 24 | 171 | 3030 | 7 |
| Vistalon 5600[1] (EPDM) | 10.1 | 114 | 176 | 2880 | 3 |
| Vistalon 5600[2] (EPDM) | 7.3 | 82 | 180 | 3020 | 10 |
| TP 320[1] (S-EPDM) | 13.4 | 147 | 137 | 3260 | 6 |

TABLE 1-continued

IMPACT IMPROVEMENT OF EXXON POLYPROPYLENE E-117 WITH THE ADDITION OF RUBBERS AT A 10 WT % LEVEL

| Rubber | −30° C. Impact | | 23° C. Flex | 23° C. Tensile | |
|---|---|---|---|---|---|
| | Izod ft-lb/in | Gardner in-lb/0.125 in | Modulus k psi | Yield psi | Weld Line Elongation, % |
| TP 320[2] (S-EPDM) | 9.6 | 110 | 140 | 3260 | 400 |

[1]Introduced with HDPE at a ratio of 1:1
[2]Introduced with high MW PP (Exxon E-612) at a ratio of 1:1

The data in Table 1 shows that modification of E-117 polypropylene with TP-320 zinc sulfonated EPDM at a 10 wt.% level and with high $\overline{M}w$ PP (E-612) at a 10 wt.% level produced high weld line elongation (comparable to the unmodified PP which is also similar to elongation at break when no weld line is introduced) along with an improved impact strength at a relatively high flexural modulus. The other compositions are capable of improving the impact strength but they also greatly deteriorate the weld line elongation.

Example 3

Blends of E-117 polypropylene were prepared as described in Example 2 using a master batch comprising sulfonated EPDM and E-612 polypropylene wt. of 1:1 ratio. The final product had 10 wt.% of sulfonated EPDM.

In this example a blend with a TP-320, zinc sulfonated EPDM, is compared to a blend with TP-342, a barium sulfonated EPDM.

TABLE II

| E-117 Polypropylene Blends Including 10 wt. % of Sulfonated EPDM and 10 wt. % of E-612 Polypropylene | | | | |
|---|---|---|---|---|
| | | −30° C. Impact | | Weld Line |
| Sulfo EPDM | Counterion | Izod ft-lb/in | Gardner in-lb/0.125 in | Elongation % |
| TP-320 | Zn | 9.6 | 110 | 400 |
| TP-342 | Ba | 7.3 | 28 | 7 |

The data in Table 2 shows that weld line elongation of E-117 polypropylene modified with a barium-sulfonated EPDM is much shorter than that of a sample containing zinc-sulfonated EPDM. Zinc is therefore the preferred counter-ion for the purpose of improving the impact and the weld line properties of a polypropylene homopolymer.

Since many modifications and variations of this invention may be made without departing from the spirit or scope of the invention thereof, it is not intended to limit the spirit or scope thereof to the specific examples thereof.

Example 4

The sulfonated EPDM terpolymer (TP-320), the high density polyethylene (Paxon AB-50-003) and the polypropylene (Exxon, E-612) of Example 2 were used to modify the polypropylene resin (Exxon, E-117) of Example 2 without a preferred ionic plasticizer. The method of mixing these ingredients, as well as sample preparation and mixing, were as in Example 2. Test results are shown in Table III.

TABLE III

| Impact Improvement of Exxon Polypropylene E-117 With the Addition of 10 wt. % of Sulfonated EPDM Terpolymer | | | | |
|---|---|---|---|---|
| | −30° C. Impact | | 23° C. Flex | 23° C. Tensile | |
| Sulfo-EPDM | Izod ft-lb/in | Gardner in-lb/0.125 in | Modulus k psi | at Yield psi | Weld Lind Elongation, % |
| TP 320[1] | 11.2 | 209 | 144 | 3820 | 7 |
| TP 320[2] | 7.7 | 85 | 140 | 3800 | 390 |

[1]Introduced with HDPE at a ratio of 1:1
[2]Introduced with high MW PP (Exxon E-612) at a ratio of 1:1

The data in Table III show that modification of E-117 polypropylene with TP-320 zinc sulfonated EPDM at a 10 wt. % level and without a preferred ionic plasticizer result with improved impact properties for the polypropylene, similar to the improvement shown in Example 2. In this example it is again demonstrated that introducing the rubber with a high molecular weight polypropylene (Exxon, E-612) results in a high weld line elongation.

Example 5

Modification of Exxon E-117 polypropylene was done with a barium sulfonated EPDM (TP-342) as in Example 3. Mixing was done in the manner described in Example 2. The preferred ionic plasticizer used for this example was Acrawax C (N N′ ethylene bis-stearamide, made by Glyco Chemical Co.) at a level of 6 phr. Preparation of samples and testing was done as in Example 2 and the data are shown in Table IV.

TABLE IV

| E-117 Polypropylene Blends Including 10 wt. % of TP-342, Barium Sulfonated EPDM and 6 phr of Acrawax C | | |
|---|---|---|
| | −30° C. Impact | |
| Third Component[1] | Izod ft-lb/in | Gardner in-lb/0.125 in |
| HDPE (Paxon AB-50-003) | 12 | 151 |
| PP (Exxon E-612) | 7.3 | 28 |

[1]Third component introduced in a rubber masterbatch at a ratio of 1:1

This Example shows that good impact improvement can be produced with the addition of a barium sulfonated EPDM when a proper third ingredient and a proper preferred ionic plasticizer are used. In this case, the proper third ingredient is HDPE and the preferred ionic platicizer is Acrawax C.

What is claimed is:

1. A polypropylene resin which consists essentially of a blend of:
   (a) an isotactic polypropylene homopolymer having an $\overline{M}_n$ as measured by GPC of at least about 15,000;
   (b) about 5 to about 15 parts by weight of a zinc neutralized sulfonated EPDM terpolymer per 100 parts by weight of said isotactic polypropylene homopolymer; and
   (d) about 5 to about 15 parts by weight of a high molecular weight polypropylene per 100 parts by weight of said isotactic polypropylene resin, said high molecular weight polypropylene having an $\overline{M}_n$ of about 80,000.

2. A polypropylene resin according to claim 1 further including about 1 to about 40 parts by weight of zinc stearate per 100 parts by weight of the neutralized sulfonated EPDM terpolymer.

3. A polypropylene resin according to claim 1 which has an Izod impact strength unnotched at $-30°$ C. of at least about 8 ft-lb/in.

4. A polypropylene resin according to claim 1, wherein said zinc neutralized EPDM terpolymer has about 10 to about 40 meq. of sulfonate groups per 100 grams of said zinc neutralized sulfonated EPDM terpolymer, wherein at least 95% of said sulfonate groups are neutralized with a zinc counterion.

5. A polypropylene resin according to claim 1, further including about 1 to about 40 parts by weight of a preferential plasticizer per 100 parts by weight of the neutralized sulfonated EPDM terpolymer, said preferential plasticizer being selected from the group consisting of amides, thioureas, carboxylic acids having about 12 to about 30 carbon atoms, and metallic salts of carboxylic acids.

6. A polypropylene resin according to claim 1 wherein said zinc neutralized sulfonated EPDM terpolymer is derived from an EPDM terpolymer having about 45 to about 75 wt. % ethylene and about 2.6 to about 8.0 wt. % of a non-conjugated diene.

7. A polypropylene resin according to claim 6 wherein said non-conjugated diene is selected from the group consisting of 1,4-hexadiene, dicyclopentadiene, 5-ethylidiene-2-norbornene, 5-methylene-2-norbornene, 5-propenyl-2-norbornene and methyl tetrahydroindene.

8. A polypropylene resin according to claim 6 wherein said non-conjugated diene is 5-ethylidene-2-norbornene.

* * * * *